United States Patent [19]

Alexandrov et al.

[11] 4,065,076
[45] Dec. 27, 1977

[54] PIPELINE FOR PNEUMATIC TRANSPORTATION OF CARGOES IN CONTAINERS

[76] Inventors: Adolf Moritsovich Alexandrov, Federativny prospekt, 6, korpus 3, kv. 8; Vladimir Efimovich Aglitsky, Zatsepsky val, 6/13, kv. 61; Jury Abramovich Tsimbler, Sojuzny prospekt, 10, kv. 261; Mikhail Vladimirovich Lurie, ulitsa Veernaya, 40, korpus 3, kv. 43; Jury Arnoldovich Topolyansky, ulitsa Matveevskaya, 10, korpus 4, kv. 233; Ilya Solomonovich Kantor, Teply stan, mikroraion 8-a, korpus 10ab, kv. 98; Anatoly Petrovich Chizhikov, ulitsa Petrovka, 26, kv. 3, all of Moscow; Dmitry Rudolfovich Gun, Komsomolskaya ulitsa, 7, kv. 29, Ljubertsy Moskovskoi oblasti, all of U.S.S.R.

[21] Appl. No.: 703,838

[22] Filed: July 9, 1976

[30] Foreign Application Priority Data

July 10, 1975  U.S.S.R. ............................... 2154918

[51] Int. Cl.² ............................................. B65G 51/20
[52] U.S. Cl. .................................. 243/38; 104/138 R
[58] Field of Search ............ 104/155, 138 R; 243/38, 243/39, 1, 2, 3, 4, 32

[56] References Cited

U.S. PATENT DOCUMENTS 3,952,667   4/1976   Kovanov et al. .................... 243/38

FOREIGN PATENT DOCUMENTS 1,122,856   8/1968   United Kingdom ................. 243/38

Primary Examiner—Evon C. Blunk
Assistant Examiner—Jeffrey V. Nase
Attorney, Agent, or Firm—Fleit & Jacobson

[57] ABSTRACT

The pipeline according to the invention is used in installations for pneumatic transportation of cargoes in containers or container trains on an air cushion. In the braking zone said pipeline is connected by a bypass pipeline comprising a gate which closes the area through said bypass pipeline when the container passes freely through the braking zone and opens it when the container is to be braked. The bypass pipeline is installed at the beginning of the braking zone so that one of its ends is connected to the lower part of the transportation pipeline and the other one, to the upper part and, as a result, when the container passes through this zone and the gate of the bypass pipeline is open, pressure in the space under and above the container is equalized and the container is braked.

5 Claims, 5 Drawing Figures

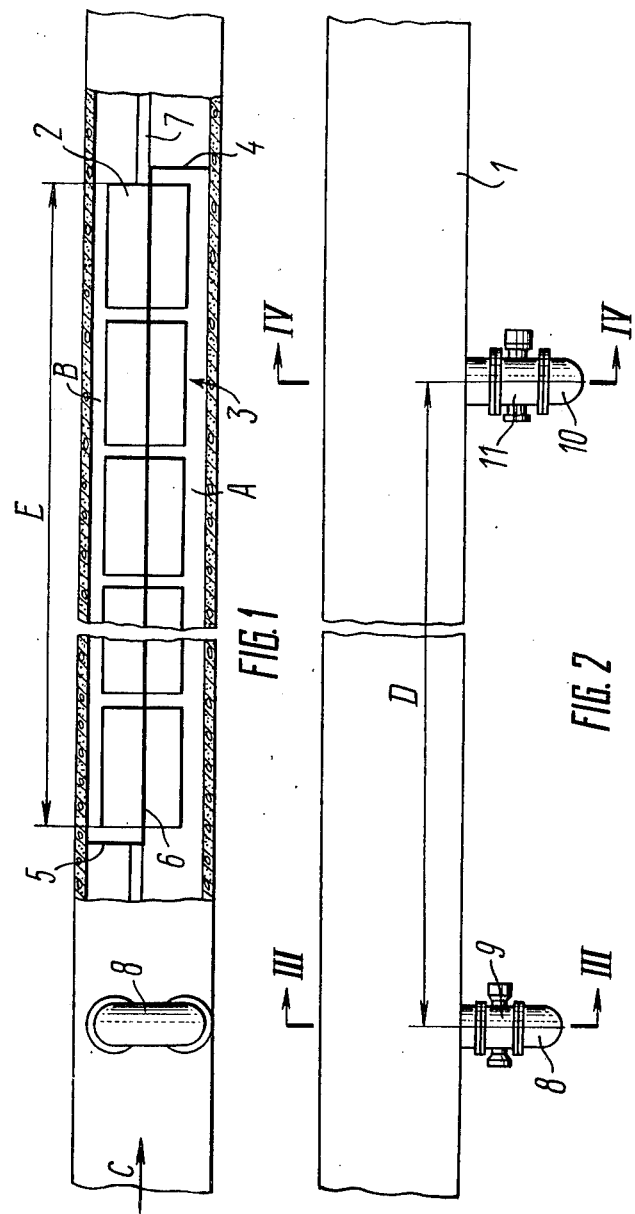

PIPELINE FOR PNEUMATIC TRANSPORTATION OF CARGOES IN CONTAINERS

The present invention relates to installations for pneumatic pipeline transportation of cargoes in containers and more particularly it relates to pipelines for pneumatic transportation of cargoes in containers or container trains on an air cushion.

Widely known in the art are installations for pneumatic transportation of containerized cargoes in which the pipeline referred to hereinafter as "transportation pipeline" is provided at each braking zone with a bypass pipeline mounted parallel with the transportation pipeline and connected to the latter by the ends. One end of the bypass pipeline is connected to the beginning of the braking zone of the transportation pipeline and the other end, to the end of said zone. The points of connection of the bypass pipeline are located at a distance which is not smaller than the length of the container train and not smaller than the train braking distance. The bypass pipeline is provided with a gate which closes it when the containers pass freely through the braking zone of the pipeline. With the gate open part of the air passes through the bypass pipeline thus equalizing pressure before and after the container train and slowing down or braking the latter. The speed of the container train depends on the opening angle of the gate.

The transportation pipelines described above are employed for displacement of containers or container trains provided with any type of cup seals and, in particular, of containers on an air cushion which have Z-shaped seals formed by the lower front and upper rear face half-cups which are connected with longitudinal side cups.

The use of the above-described pipeline for transportation of cargoes in containers on an air cushion is not commercially profitable since a comparatively long length of the bypass pipeline raises its cost.

An object of the present invention is to provide a pipeline for pneumatic transportation of cargoes in air-cushioned containers or container trains which would be comparatively simple in design and cheap.

In accordance with this and other objects we hereby provide a pipeline for pneumatic transportation of cargoes in air-cushioned containers and container trains, said pipeline being provided in the container braking zone with a bypass pipeline whose gate closes said bypass pipeline when the containers pass freely through the braking zone and opens it during braking wherein, according to the invention, the bypass pipeline is mounted at the beginning of the container braking zone so that one of its ends is connected to the lower part of the transportation pipeline and the other one, to its upper part and, as a result, when the container passes through the braking zone and the bypass pipeline gate is open, pressure under and above the container is equalized and said container is braked.

It is expedient that the pipeline in the braking zone should have at least one additional bypass pipeline with a gate closing it when the containers pass freely through the braking zone, said additional bypass pipeline being mounted at such a distance from the main bypass pipeline which is somewhat smaller than the length of the container and being connected by one end to the lower part of the pipeline and by the other end, to its upper part.

The provision of additional bypass pipelines ensures reliable complete stopping of containers or container trains.

It is no less expedient that the bypass pipeline and the additional bypass pipeline should be mounted so that their connections to the transportation pipeline should be located actually in one and the same plane passing through the cross section of the pipeline.

This method of connecting the bypass pipelines yields maximum economy of metal.

It is preferable that the cross-sectional area of the additional bypass pipeline should be somewhat larger than that of the bypass pipeline connected at the beginning of the braking zone.

Such a ratio of the cross-sectional areas of the bypass pipelines will ensure smooth braking of the containers.

The pipeline for pneumatic transportation of cargoes in containers or container trains on an air cushion realized in accordance with the present invention is comparatively simple in construction and requires a smaller amount of materials for its manufacture which, in turn, cuts down its manufacturing cost to a certain extent.

Now the invention will be described in detail by way of example with reference to the accompanying drawings in which:

FIG. 1 is a partial section through the pipeline according to the invention, showing the braking zone with a container train;

FIG. 2 is a general top view of the pipeline in the braking zone;

Figure 3:
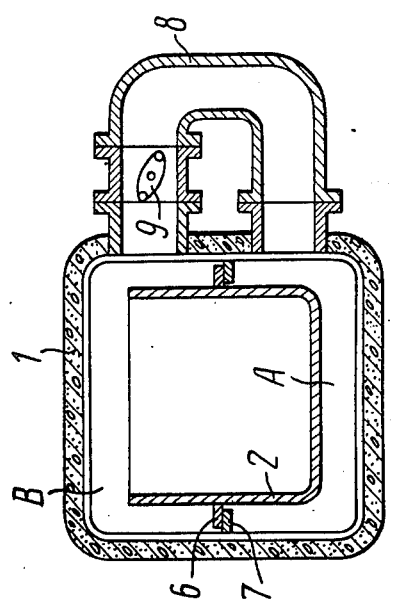
FIG. 3 is a section taken along line III—III in FIG. 2, enlarged, showing a modification of the container train with a rigidly connected longitudinal side cup.

The pipeline 1 (FIGS. 1, 2) is designed for pneumatic transportation of cargoes in containers 2 connected into a train 3 on an air cushion. The train 3 of the containers 2 is provided with a front lower face half-cup 4 and a rear upper face half-cup 5. These half-cups are interconnected by longitudinal side cups 6. The face half-cups 4 and 5 and the longitudinal side cups 6 divide the pipeline 1 into two spaces, namely lower space A under the containers and upper space B above the containers. The train 3 rests through the longitudinal side cups 6 on longitudinal guides 7 made on the opposite side walls of the pipeline 1.

The pipeline 1 in the braking zone has a bypass pipeline 8 mounted at the beginning of the braking zone in the direction of movement of the container train 3 shown by arrow C. One end of this bypass pipeline is connected to the lower part of the pipeline 1 and the other end, to its upper part as shown in FIGS. 1 and 3 so that on passing of the container train 3 through this zone, said bypass pipeline interconnects spaces A and B of the pipeline 1.

The bypass pipeline 8 is provided with a built-in gate 9 which closes it when the container train 3 passes freely through the pipeline 1. With the gate 9 open the spaces A and B communicate with each other so that pressure in said spaces is equalized and the train 3 is braked.

The bypass pipeline 8 is connected with the pipeline 1 so that the points of connections lie in one and the same plane passing through the cross section of the pipeline 1. In this method of connection the bypass pipeline 8 has a minimum length and, accordingly, requires a small amount of metal or other materials for its manufacture.

To provide complete stopping of the container train 3 the pipeline 1 in the braking zone has an additional bypass pipeline 10 mounted at distance D from the bypass pipeline 8, said distance being somewhat shorter that the length E of the train 3 of containers 2.

Figure 4:
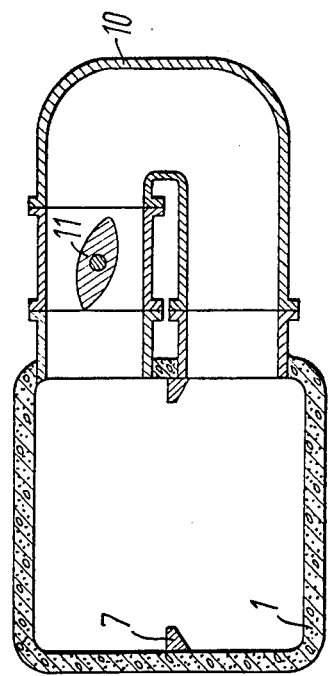
FIG. 4 is a section taken along line IV — IV in FIG. 2, enlarged.

The additional bypass pipeline 10 (FIG. 4) is connected by one end to the lower part of the pipeline 1 and by its other end, to the upper part. The additional bypass pipeline 10 is provided with a gate 11 which closes said pipeline when the container train 3 passes freely through the braking zone.

The area through the additional bypass pipeline 10 is larger than that through the bypass pipeline 8 (FIG. 3). This ratio of the cross-sectional areas of the bypass pipelines ensures smooth braking of the container train 3.

If the length of the braking zone is larger than that of the train, it is practicable to provide said zone with several additional bypass pipelines spaced from one another at a distance which is shorter than the length of the container train.

The length of the braking zone depends on the braking distance of the containers.

The pipeline for pneumatic transportation of cargoes in containers operates as follows.

The train 3 of containers 2 is propelled through the pipeline 1 by a tractive force created due to a difference of pressures before and after the train 3. The pressure differential in spaces A and B builds up a lifting force which raises the train 3 in the pipeline 1 thus creating the "air cushion" effect.

When the gate 9 of the bypass pipeline 8 is closed, the container train 3 of containers 2 passes freely through the braking zone.

When the container train 3 of container 2 passes through the braking zone with the gate open, spaces A and B intercommunicate with each other, the pressure difference between them decreases and the train 3 is slowed down. At the moment when the last container of the train 3 moves past the connection of the bypass pipeline 8, the first container of said train enters the zone of installation of the additional bypass pipeline 10 which has a larger cross-sectional area and is connected to the pipeline 1 at a distance from the bypass pipeline 8 which is shorter than the length E of the container train. At this time the gate 11 of the additional bypass pipeline 10 opens, pressure in space A becomes equal to that in space B whereas pressure before the train 3 becomes equal to pressure after it and the train 3 comes to a halt.

Figure 5:
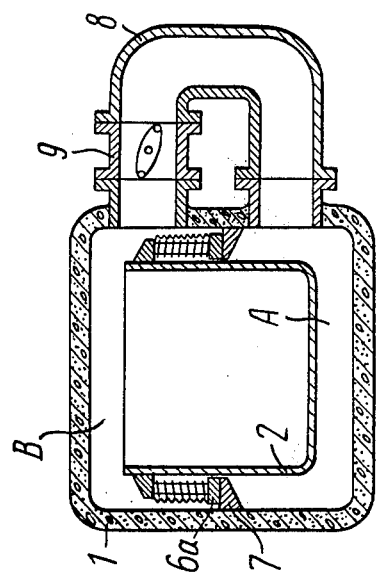
FIG. 5 is a section taken along line III — III in FIG. 2, enlarged, showing a modification of the container train with a flexibly-connected longitudinal side cup.

The pipeline according to the invention can be used for the transportation of cargoes in containers with a rigidly connected longitudinal side cup 6 as shown in FIG. 3 or with a flexibly connected longitudinal side cup 6a as shown in FIG. 5.

We claim:

1. A pipeline for pneumatic transportation of cargoes in containers and container trains having front and rear half-seals connected by longitudinal seals which cooperate to cause the train to ride on an air cushion, said pipeline having a container breaking zone comprising a bypass pipeline extending substantially transverse to the pipeline and having a gate which closes said bypass pipeline to permit the containers to pass freely through the braking zone and opens during braking of the containers wherein the bypass pipeline is mounted at the beginning of the container braking zone such that one of its ends is connected to only a lower part of the transportation pipeline below the longitudinal seals and the other one, only to an upper part of the transportation pipeline above the longitudinal seals whereby when the container passes through the braking zone and the gate of the bypass pipeline is open, pressure under and above the container is equalized and said container is braked.

2. A pipeline according to claim 1 wherein the braking zone is provided with at least one additional bypass pipeline comprising a gate which closes to permit the containers to pass freely through the braking zone, said additional pipeline being installed at a distance from the bypass pipeline which is shorter than the length of the container and having one end connected only to the lower part of the transportation pipeline and the other end connected only to its upper part.

3. A pipeline according to claim 2 wherein the cross-sectional area through the additional bypass pipeline is larger than that through the bypass pipeline connected at the beginning of the braking zone.

4. A pipeline according to claim 2 wherein the additional bypass pipeline is installed so that the points of its connections to the transportation pipeline are located actually in one and the same plane passing through the cross section of said transportation pipeline.

5. A pipeline according to claim 1 wherein the bypass pipeline is mounted so that the points of its connections to the transportation pipeline are located actually in one and the same plane passing through the cross section of the transportation pipeline.

* * * * *